RADIOACTIVE BATTERY EMPLOYING STACKED SEMI-CONDUCTING DEVICES

Filed Aug. 2, 1954

INVENTORS
RALPH L. SHERWOOD &
PAUL RAPPAPORT
BY J. C. Whittaker
ATTORNEY

United States Patent Office 2,819,414

Patented Jan. 7, 1958

2,819,414

RADIOACTIVE BATTERY EMPLOYING STACKED SEMI-CONDUCTING DEVICES

Ralph L. Sherwood, Mercerville, and Paul Rappaport, Princeton, N. J., assignors to Radio Corporation of America, a corporation of Delaware Application August 2, 1954, Serial No. 447,208

16 Claims. (Cl. 310—3)

Figures 1, 2:
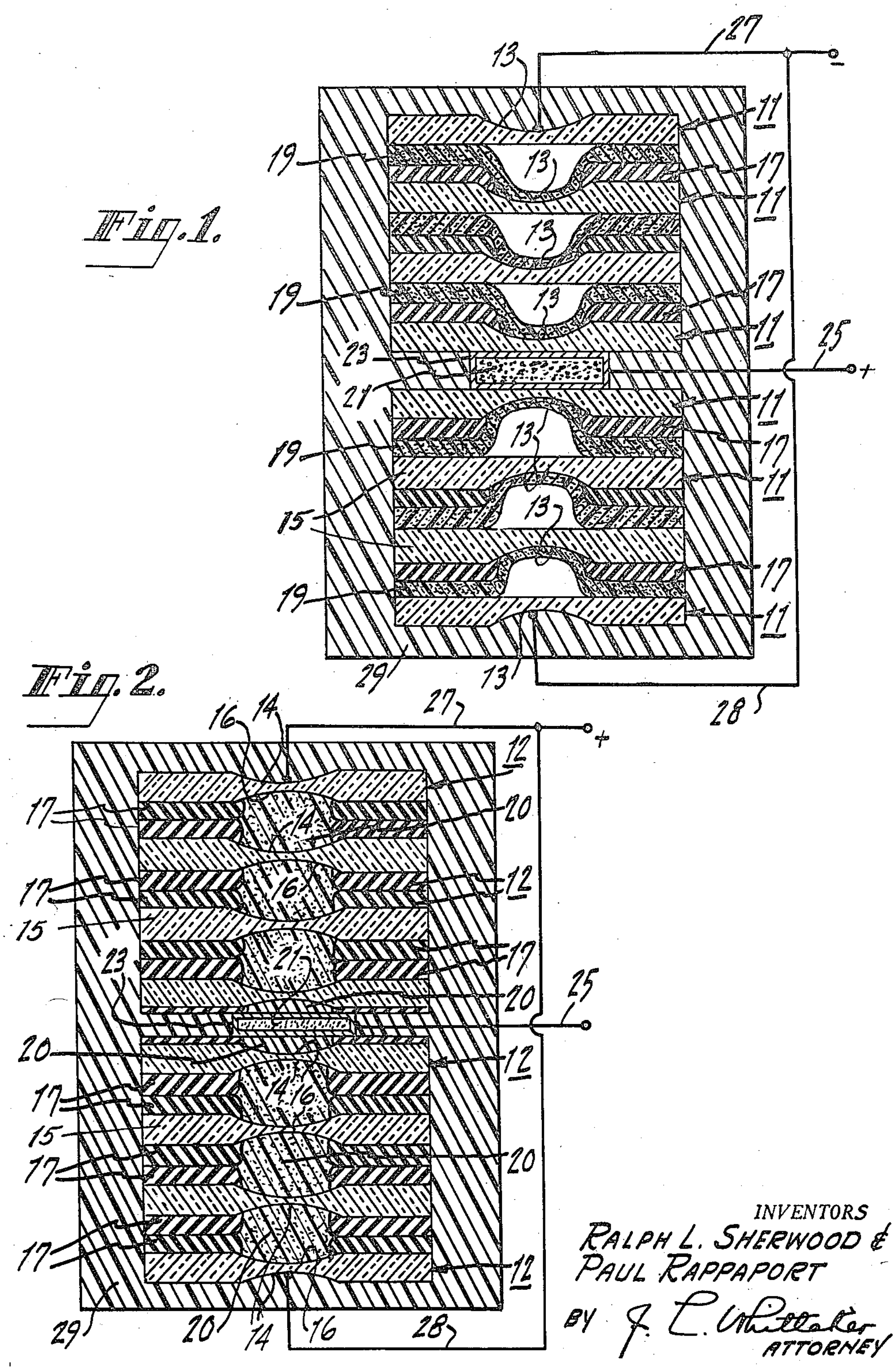

This invention relates generally to batteries of the type employing radioactive isotopes and semi-conducting materials. Particularly the invention relates to an improved radioactive or atomic battery in which an electrically conductive plastic material is utilized to provide ohmic contact between a plurality of stack alloy junction type semi-conducting devices, each of the devices comprising an element of the battery.

Radioactive batteries are known in which an alloy junction type semi-conducting device having one or more rectifying junctions is irradiated with emissions from a radioactive source. The radioactive emissions penetrate the device and interact with the valence bonds of the semi-conducting material to liberate charge carriers therein (electrons and holes). These charge carriers flow within the device under the influence of electrostatic potential barriers existing in the junction regions to provide a potential at the output terminals of the battery. The output potential thus developed may be utilized to supply current and power to a load circuit.

Frequently it is desirable to stack a plurality of relatively thin alloy junction devices, electrically in series with each other, for irradiation by a single radioactive source. Advantages of irradiating a stacked configuration of thin devices over irradiating a single thick semi-conducting device include (1) efficient utilization of semi-conducting material in which charge carriers have relatively short diffusion lengths, (2) a higher potential available at the output terminals of the device, and (3) more efficient utilization of the high energy emissions produced by the radioactive source.

One of the simplest means for providing electrical contact between stacked devices of the above type is to physically butt the devices together so that the so-called pellet of impurity material of each device contacts the semi-conducting body portion of an adjacent device. The principal disadvantage of this arrangement, however, is that each pellet usually includes a certain amount of excess impurity material which undesirably absorbs radioactive emissions without contributing to the voltage or current output of the battery. This undesirable absorption of radioactive emissions may be obviated by removing the excess impurity material without disturbing the rectifying nature of the junctions. However, when the excess impurity material is removed the devices cannot be butted together to make electrical contact without danger of short-circuiting or introducing leakage paths around one or more of the junctions. Therefore, after removal of the excess material, the p-type conductivity region of one device may be electrically connected to the n-type region of an adjacent device by soldering a very thin insulated conductive lead therebetween with a suitable low melting point solder. This technique, however, is tedious, extremely difficult, and time consuming since a single stacked assembly may include as many as ten to twenty thin semi-conducting devices.

An object of the present invention is to provide an improved battery of the type employing radioactive isotopes and semi-conducting materials.

Another object of the invention is to provide an improved radioactive battery which is characterized by ruggedness, long life, and small size.

Another object of the invention is to provide an improved radioactive battery employing a plurality of stacked semi-conducting devices.

Another object of the invention is to provide a device of the above type having improved means for providing ohmic contact between the stacked semi-conducting devices.

A further object of the invention is to provide an improved radioactive battery which efficiently utilizes semi-conducting material in which charge carriers produced therein as a result of penetration by radioactive emissions have relatively short diffusion lengths.

A further object of the invention is to provide an improved radioactive battery employing a plurality of thin stacked semi-conducting devices which, in response to irradiation by radioactive emissions, provides a higher terminal voltage than is afforded by irradiation of a single thicker semi-conducting device.

A still further object of the invention is to provide an improved radioactive battery which efficiently utilizes radioactive emissions for power generation.

The foregoing and other objects and advantages of the invention are achieved as follows. According to a typical embodiment of the invention, the excess impurity material is removed from a plurality of alloy junction semi-conducting devices by known techniques, such as by amalgamating with mercury, each of the devices having a single rectifying junction. An insulating coating is applied to a first one of the devices so that the coating covers the surface of the semi-conducting body except a central portion of the region wherein the impurity material is alloyed to form the junction. It is important that the insulating coating cover the exposed portion of the junction interface. An electrically conductive thermosetting plastic material, for example, conductive material dispersed in Araldite, which hardens at low temperatures, is applied to the device to make electrical contact to the remaining central portion of the surface wherein the junction is formed. A second alloy junction device then is placed or stacked on top the first device so that its body portion makes electrical contact to the conductive plastic material. An insulating coating and a conductive plastic material are then applied to the second semi-conducting device in precisely the same manner described above with reference to the first device.

Any desired additional number of junction devices may be stacked on top the first two devices in this manner. When the thermosetting plastic hardens a stacked configuration of alloy junction devices is provided in which the devices electrically are connected in series with excellent ohmic contact between adjacent devices. One or more of these stacked arrangements, together with a radioactive emission source, may be encased in a suitable insulating member, preferably opaque to light, and the assembled device utilized to supply electric current and voltage to a load circuit.

A second embodiment of the invention comprises a stacked arrangement of semi-conducting devices in which each device comprises a body of semi-conducting material having rectifying junctions formed in opposing surfaces thereof. This embodiment of the invention also utilizes the conductive plastic material for providing ohmic contact between adjacent devices and its method of fabrication is similar in part to the method briefly described above of stacking single junction devices.

The invention will be described in greater detail with reference to the accompanying drawing in which:

Figure 1 is a sectional elevational view of a first embodiment of the invention in which a plurality of single junction alloy junction type semi-conducting devices are stacked with the devices electrically in series, and Figure 2 is a sectional elevational view of a second embodiment of the invention in which the semi-conducting devices each include a pair of rectifying junctions.

Similar reference characters are applied to similar elements throughout the drawing.

Referring to Figure 1, a radioactive battery includes a plurality of thin alloy junction type semi-conducting devices 11, each of which includes a single p-n junction 13. The thickness of each device 11 may be of the order of ten mils. The body portion 15 of each of the devices 11 may comprise any one of a number of suitable semi-conducting materials such as, for example, silicon, germanium, cadmium sulfide, and indium antimonide, the latter being one of the intermetallic compounds. For purposes of the present description it is assumed that p-type silicon is chosen in which charge carriers (electrons and holes) have relatively short diffusion lengths, of the order of five mils or less, and that the resistivity of the silicon is of the order of one to ten ohm-centimeters or higher. The impurity material which imparts n-type conductivity to a localized region of each silicon body portion to form the p-n junction 13 may comprise, for example, gold antimony, antimony, or alloys of arsenic, antimony, or phosphorous.

The battery is fabricated in the following manner. The excess impurity material included on each p-n junction device 11 is removed from the device by applying mercury to the material to amalgamate therewith. The excess impurity material goes into a mercury solution which easily may be removed from the device by washing or other means. Another means of removing the excess impurity material is by cutting or machining.

After removal of the excess impurity material an insulating coating 17 is applied to the surface of a first one of the devices 11 wherein the p-n junction is formed. The insulating coating 17, one to two mils thick, is applied to the entire surface of the device except a central portion of the junction region 13. It is important that the coating 17 cover the exposed portion of the junction interface. The coating 17 may comprise, for example, a solution of polystyrene in toluol which, upon evaporation of the toluol, provides an electrically insulating coating chemically inert with respect to the junction region. A coating 19 of electrically conductive plastic material is then applied to the device 11. The conductive coating 19 is applied over the insulating coating 17 and also over the central portion of the p-n junction region 13 making electrical contact thereto. Preferably the conductive coating 19 is thin in the junction region 13, of the order of one to two mils, and thicker near the edges of the device, of the order of five mils.

The conductive coating material preferably comprises a resin or plastic which hardens at low temperatures, i. e., from about room temperature to about 75° C. One such material may be selected from a sub-class of resins manufactured by the Ciba Company, Inc., under the tradename "Araldite." The mechanical and chemical properties of Araldite have been described, for example, in a paper by Preiswerk, Meyerhans, and Denz, which appears in "Materials and Methods," October 1949, and by Preiswerk and Meyerhans in "Electrical Manufacturing," July 1949. Further information on the chemical composition of Araldite may be found in a paper by Ott which appears in "Schweizer Archiv," January 1949, pages 23–31. A translation of this paper has been published by The Technical Service Department, Aero Research Limited, Duxford, Cambridge, England, which is entitled "Aero Research Technical Notes," Bulletin No. 75, March 1949. Reference also may be made to Patents Nos. 2,324,483 and 2,444,333 to Castan which disclose examples of Araldite resins.

In preparing the conductive plastic medium, a quantity of the selected resin powder is dissolved in a suitable alkyl amine hardener, preferably one of the lower alkyl amines, and a quantity of metallic powder is dispersed therein. The powder may comprise unoxidized silver, copper, nickel, carbonyl iron, or the like, preferably in the form of thin, flat, rectangular platelets present in the mixture in an amount varying from 45% to 80% by weight. The mixture is thus fluid at room temperature and remains so for the order of several hours.

After this conductive plastic coating 19 has been applied to the alloy junction device 11 in the manner described above, a second device is stacked on top of the first device so that the surface of the second device opposite the surface in which its junction is formed makes electrical contact with the coating 19. An insulating coating 17 and a conductive plastic coating 19 are then applied to the junction surface of the second device in the same manner in which similar coatings 17 and 19 were applied to the first device. As many additional semi-conducting devices as desired may be stacked on top of each other in this manner. The number of stacked devices utilized preferably is chosen so that the stacked devices completely absorb the radioactive emissions incident thereon.

In the present example two groups of stacked p-n junction semi-conducting devices are shown which have been fabricated in the manner described above. Each group includes four devices 11 with a radioactive emission source 21 sandwiched between the groups. This arrangement is preferred in the instant battery, although not essential, to utilize efficiently emissions from the source 21 which otherwise would not contribute to a useful output current. The radioactive emitter material employed may comprise one or a combination of radioactive isotopes which emit charged particles and/or neutral emissions. Such isotopes include, by way of example, strontium 90 (an emitter of negatively charged beta particles), cobalt 60 (an emitter of neutral gamma rays), and numerous other radioactive isotopes. The emitter material utilized preferably is contained within a thin hollow electrically conductive aluminum holder 23 which is substantially transparent to the radioactive emissions.

Since the holder 23 is electrically conductive and makes electrical contact to one of the semi-conducting devices in each of the groups between which it is sandwiched, an output lead 25 may be soldered or otherwise connected thereto. Also leads 27, 28 may be connected by known techniques to the junction regions 13 of the two semi-conducting devices located furthest from the radioactive source 21. These leads 27, 28 may be connected together thereby connecting the two groups of stacked semi-conducting devices in parallel. Leads 25 and 27 thus comprise the output leads of the battery and a voltage is available therebetween which may be utilized to supply current and power to a load circuit.

The entire unit preferably is encased in an electrically insulating casing 29 through which leads 25, 27, and 28 extend. The casing 29 may comprise Araldite in which an oxidized powder such as titanium dioxide rather than an unoxidized powder is dispersed. This mixture of Araldite and oxide is electrically insulating rather than conductive and is opaque to the transmission of light. The casing 29 affords mechanical support for the structure encased therein and additionally serves to absorb any radioactive emissions which might constitute a health hazard.

While the foregoing description has been directed to stacking semi-conducting devices having a single p-n junction, it is pointed out that $n$-$n^+$ and $p$-$p^+$ devices also may be stacked in this manner. These latter devices are devices in which the semi-conducting body material is either n-type or p-type and the impurity material imparts the same type conductivity, i. e., n-type or p-type, but has a different degree of impurity concentration.

Referring to Figure 2, a second embodiment of the invention is shown in which n-intrinsic-p alloy junction type semi-conducting devices 12 rather than single p-n junction devices are stacked in accordance with the invention. An n-intrinsic-p device is a device in which the semi-conducting material is substantially pure, i. e., very few donor or acceptor atoms are present, and the p-type and n-type conductivity regions are formed in the intrinsic material. Intrinsic semi-conducting material is characterized by a number of factors, one of which is high resistivity. In the instant embodiment the p-type and n-type conductivity regions 14 and 16, respectively, are formed in opposing surfaces of the intrinsic semi-conducting body.

The excess impurity material is removed from each of the n-intrinsic-p devices in the manner described previously, i. e., with mercury or by cutting or machining. An insulating coating 17 is applied to the surface of a first device 12 in which an n-type conductivity region is formed. The coating 17 covers the entire surface of the device including the exposed portion of the junction interface except for a central portion of the junction region 16. A similar coating 17 is applied to the surface of a second n-intrinsic-p device wherein a p-type conductivity region 14 is formed. The two devices are then stacked so that the two coatings 17 are in contact with each other and the p-region of one device is adjacent the n-region of the second device. The volume defined by the central portions of the junction regions 14 and 16 and the coatings 17 is filled with a conductive plastic material 20 of the type described. Additional devices may be stacked on top of one another in this manner. Again it is preferred that the radioactive emitter material 21 be sandwiched between two groups of semi-conducting devices. Electrical contact may be made between the emitter material holder 23 and the n-type junction region 14 of the nearest device in each group by the conductive plastic material 20.

What is claimed is:

1. A primary source of electrical energy comprising, a plurality of aligned spaced junction type semi-conducting devices, an electrically conductive plastic material between adjacent ones of said devices providing electrical contact therebetween, means for connecting said aligned devices to an external circuit, and a radioactive source positioned to irradiate all of said semi-conducting devices to generate an electric potential which is available at said external circuit connection means.

2. A primary source of electrical energy comprising, a plurality of aligned spaced junction type semi-conducting devices each having a region of p-type conductivity and a region of n-type conductivity, an electrically conductive plastic material between adjacent ones of said devices providing electrical contact between the p-type conductivity region of each of said devices and the n-type conductivity region of an adjacent device, means for connecting said aligned devices to an external circuit, and a radioactive source positioned to irradiate all of said semi-conducting devices to generate an electric potential which is available at said external circuit connection means.

3. A primary energy source as claimed in claim 2, including an electrical insulating casing surrounding said devices and radioactive source, said connection means extending through said insulating casing.

4. A primary energy source as claimed in claim 3, said casing being plastic and opaque to the transmission of light.

5. A primary source of electrical energy comprising, a plurality of aligned spaced alloy junction type semi-conducting devices each having a body portion of one type conductivity and a region formed in one surface of said body portion having a conductivity type opposite to said one type, an electrically conductive plastic material between adjacent ones of said devices providing electrical contact between the body portion of each of said devices and a central portion of the opposite type conductivity region of an adjacent device, means for connecting said aligned devices to an external circuit, and a radioactive source positioned to irradiate all of said semi-conducting devices to generate an electric potential which is available at said external circuit connection means.

6. A primary energy source as claimed in claim 5 including an insulating member between each of said devices, said insulating member being in contact with the entire area of said one surface of a given device except for said central portion.

7. A primary energy source as claimed in claim 5, said insulating member comprising a material chemically inert with respect to said opposite type conductivity region.

8. A primary source of electrical energy comprising a plurality of aligned spaced junction type semi-conducting devices each having a body portion of one type conductivity and a region formed in one surface of said body portion having a conductivity type opposite to said one type, an insulating member between adjacent ones of said devices chemically inert with respect to said opposite type conductivity region in contact with the entire portion of said one surface except for a central portion of said opposite type conductivity region, a coating of conductive plastic material between adjacent ones of said devices in contact with said insulating member, said central portion, and the body portion of an adjacent semi-conducting device, a radioactive source positioned to irradiate all of said semi-conducting devices whereby said emissions from said source successively penetrate said devices, and connection means to the semi-conducting devices nearest and most remote from said source for applying an electric potential to an external circuit.

9. A primary energy source as claimed in claim 8, the portion of said conductive plastic coating in contact with said central portion of said opposite type conductivity region being thinner than the coating portion in contact with said insulating member.

10. A primary source of electrical energy comprising, a plurality of aligned spaced alloy junction type semi-conducting devices each having a body portion having a resistivity in or near the intrinsic region and p-type and n-type conductivity regions formed in opposing surfaces of said body portion, an electrically conductive plastic material between adjacent ones of said devices providing electrical contact between the central portions of the p-type conductivity region of each of said devices and the central portion of the n-type conductivity region of an adjacent device, means for connecting said aligned devices to an external circuit, and a radioactive source positioned to irradiate all of said semi-conducting devices to generate an electric potential which is available at said external circuit connection means.

11. A primary energy source as claimed in claim 10 including an insulating member filling the spaces between adjacent semi-conducting devices except for said central portions.

12. A primary energy source as claimed in claim 11, said insulating member comprising a material chemically inert with respect to said n-type and p-type conductivity regions.

13. A primary source of electrical energy comprising a radioactive emission source, a first group of aligned alloy junction type semi-conducting devices spaced successively from one side of said source each device having a body portion of one type conductivity and a region formed in one surface of said body portion having a conductivity type opposite to said one type, an electrically conductive plastic material between adjacent ones of said devices in said first group providing electrical contact between the body portion of each of said devices and a central portion of the opposite type conductivity region of an adjacent device, a second group of aligned alloy junction type semi-conducting devices spaced successively from another side of said source each device having a body portion of said one type conductivity and a region formed in one surface of said body portion having said opposite type conductivity, an electrically conductive plastic material between adjacent ones of said devices in said second group providing electrical contact between the body portion of each of said devices and a central portion of the opposite type conductivity region of an adjacent device, and means for connecting said first and second groups of devices to an external circuit.

14. A primary energy source as claimed in claim 13, said connection means comprising means for electrically connecting said first and second groups of devices in parallel.

15. A primary source of electrical energy comprising, a radioactive emission source, a first group of aligned alloy junction type semi-conducting devices spaced successively from one side of said source each device having a body portion having a resistivity in or near the intrinsic region and p-type and n-type conductivity regions formed in opposing surfaces of said body portion, an electrically conductive plastic material between adjacent ones of said devices in said first group providing electrical contact between the central portion of the p-type conductivity region of each of said devices and the central portion of the n-type conductivity region of an adjacent device, a second group of aligned alloy junction type semi-conducting devices spaced successively from another side of said source each device having a body portion having a resistivity in or near the intrinsic region and p-type and n-type conductivity regions formed in opposing surfaces of said body portion, an electrically conductive plastic material between adjacent ones of said devices in said second group providing electrical contact between the central portion of the p-type conductivity region of each of said devices and the n-type conductivity region of an adjacent device, and means for connecting said first and second groups of devices to an external circuit.

16. A primary energy source as claimed in claim 15, said connection means comprising means for electrically connecting said first and second groups of devices in parallel.

No references cited.